United States Patent
Khidir et al.

(10) Patent No.: US 12,449,557 B2
(45) Date of Patent: Oct. 21, 2025

(54) PREDICTION OF PERMEABILITY DISTRIBUTION OF DEEP BURIED SANDSTONES USING MACHINE LEARNING

(71) Applicant: Saudi Arabian Oil Company, Dhahran (SA)

(72) Inventors: Ahmed Khidir, Dhahran (SA); Ahmed Alghamdi, Dammam (SA); Ali Al-Masrahy, Al Khobar (SA)

(73) Assignee: Saudi Arabian Oil Company, Dhahran (SA)

( * ) Notice: Subject to any disclaimer, the term of this patent is extended or adjusted under 35 U.S.C. 154(b) by 535 days.

(21) Appl. No.: 17/983,068

(22) Filed: Nov. 8, 2022

(65) Prior Publication Data
US 2024/0151868 A1 May 9, 2024

(51) Int. Cl.
G01V 1/50 (2006.01)
G06N 20/00 (2019.01)

(52) U.S. Cl.
CPC .............. *G01V 1/50* (2013.01); *G06N 20/00* (2019.01); *G01V 2210/64* (2013.01); *G01V 2210/65* (2013.01)

(58) Field of Classification Search
CPC .. G01V 1/50; G01V 2210/64; G01V 2210/65; G01V 20/00; G06N 20/00
See application file for complete search history.

(56) References Cited

U.S. PATENT DOCUMENTS 11,852,768 B2 * 12/2023 Ahmed .................. G01V 1/345
2024/0151868 A1 * 5/2024 Khidir ..................... G06N 20/00

OTHER PUBLICATIONS

Gao et al., "Mineral characteristic of rocks and its impact on the reservoir quality of He 8 tight sandstone of Tianhuan area, Ordos Basin, China," Journal of Natural Gas Geoscience, 2018, 4:205-214, 10 pages.
Kwon et al., "Permeability of illite-bearing shale: 2. Influence of fluid chemistry on flow and functionally connected pores," Journal of geophysical research, 2004, 109, B10206, 13 pages.

* cited by examiner

*Primary Examiner* — Daniel Pihulic
(74) *Attorney, Agent, or Firm* — Fish & Richardson P.C.

(57) ABSTRACT

Example computer-implemented methods, media, and systems for predicting permeability distribution of deep buried sandstones of a subsurface sandstone reservoir using machine learning. One example method includes receiving multiple wireline well log responses of multiple cored well sections of a subsurface sandstone reservoir. A respective authigenic clay type associated with each of the multiple cored well sections is received. The multiple wireline well log responses are labeled based on the respective authigenic clay type associated with each of the multiple cored well sections. A machine learning (ML) model for predicting a permeability distribution of multiple uncored well sections of the subsurface sandstone reservoir is trained based on the multiple labeled wireline well log responses of the multiple cored well sections. Multiple wireline well log responses of the multiple uncored well sections are received. The permeability distribution of the multiple uncored well sections is predicted using the trained ML model.

20 Claims, 6 Drawing Sheets

PREDICTION OF PERMEABILITY DISTRIBUTION OF DEEP BURIED SANDSTONES USING MACHINE LEARNING

TECHNICAL FIELD

The present disclosure relates to computer-implemented methods, media, and systems for prediction of permeability distribution of deep buried sandstones.

BACKGROUND

Permeability measures the capacity of a porous material to allow fluids to pass through it. Fluids can more easily flow through a material with high permeability than one with low permeability. Many factors can affect permeability, for example, the number, geometry and size of interconnected pores, capillaries and fractures of a porous material, as well as the pressure inside a material. Predicting permeability distribution of subsurface sandstone reservoirs can be a challenging task during reservoir development and exploration stages.

SUMMARY

The present disclosure involves computer-implemented methods, media, and systems for prediction of permeability distribution of deep buried sandstones using machine learning. One example computer-implemented method includes receiving multiple wireline well log responses of multiple cored well sections of a subsurface sandstone reservoir. A respective authigenic clay type associated with each of the multiple cored well sections of the subsurface sandstone reservoir is received, where the respective authigenic clay type includes a respective type of authigenic clay of each of the multiple cored well sections of the subsurface sandstone reservoir. The multiple wireline well log responses of the multiple cored well sections are labeled based on the respective authigenic clay type associated with each of the multiple cored well sections of the subsurface sandstone reservoir. A machine learning (ML) model for predicting a permeability distribution of multiple uncored well sections of the subsurface sandstone reservoir is trained based on the multiple labeled wireline well log responses of the multiple cored well sections. Multiple wireline well log responses of the multiple uncored well sections of the subsurface sandstone reservoir are received. The permeability distribution of the multiple uncored well sections of the subsurface sandstone reservoir is predicted using the trained ML model and based on the multiple wireline well log responses of the multiple uncored well sections. The predicted permeability distribution is mapped to a 3D sweet spot map of the subsurface sandstone reservoir. One or more new wellbore locations within the subsurface sandstone reservoir are identified using the 3D sweet spot map.

While generally described as computer-implemented software embodied on tangible media that processes and transforms the respective data, some or all of the aspects may be computer-implemented methods or further included in respective systems or other devices for performing this described functionality. The details of these and other aspects and implementations of the present disclosure are set forth in the accompanying drawings and the description below. Other features, objects, and advantages of the disclosure will be apparent from the description and drawings, and from the claims.

BRIEF DESCRIPTION OF DRAWINGS

Like reference numbers and designations in the various drawings indicate like elements.

DETAILED DESCRIPTION

The presence of authigenic clays in subsurface sandstone reservoir can reduce permeability. However different authigenic clay types have different effects on sandstone permeability. For example, the presence of illite in a pore system can be the main control in reducing permeability in deep buried sandstones, whereas kaolinite has minimum effect on permeability reduction.

In addition, the presence of illite in the sandstone can affect the wireline gamma ray well log responses due to the presence of potassium that results in high gamma ray log readings. On the other hand, the presence of Kaolinite or dickite can lead to lower gamma ray reading because of the absence of radioactive minerals in their chemical structure.

The relationship between authigenic clay distributions and wireline well log responses from cored section can be used to predict reservoir qualities such as permeability in uncored well sections by using machine learning (ML). A machine learning model can be built to search through data to look for patterns of log response to illite vs kaolinite distributions in cored well sections and predict the permeability distribution of uncored well sections using the patterns of log responses to illite vs kaolinite distributions in uncored well sections. The distributions of high permeable zone (kaolinite rich well section) vs low permeable zone (illite rich well section) in cored well sections can also be mapped in three-dimensional (3D) for prediction of reservoir qualities in highly heterogeneous play. The predicted distributions of high permeable zone (kaolinite rich well section) vs low permeable zone (illite rich well section) in uncored well sections can be mapped into 3D sweet spot maps that can be used for reservoir development and modeling, including identifying new wellbore locations in a subsurface sandstone reservoir.

This specification relates to predicting permeability distribution of uncored well sections of deep buried sandstones of a subsurface sandstone reservoir using machine learning.

Figure 1:
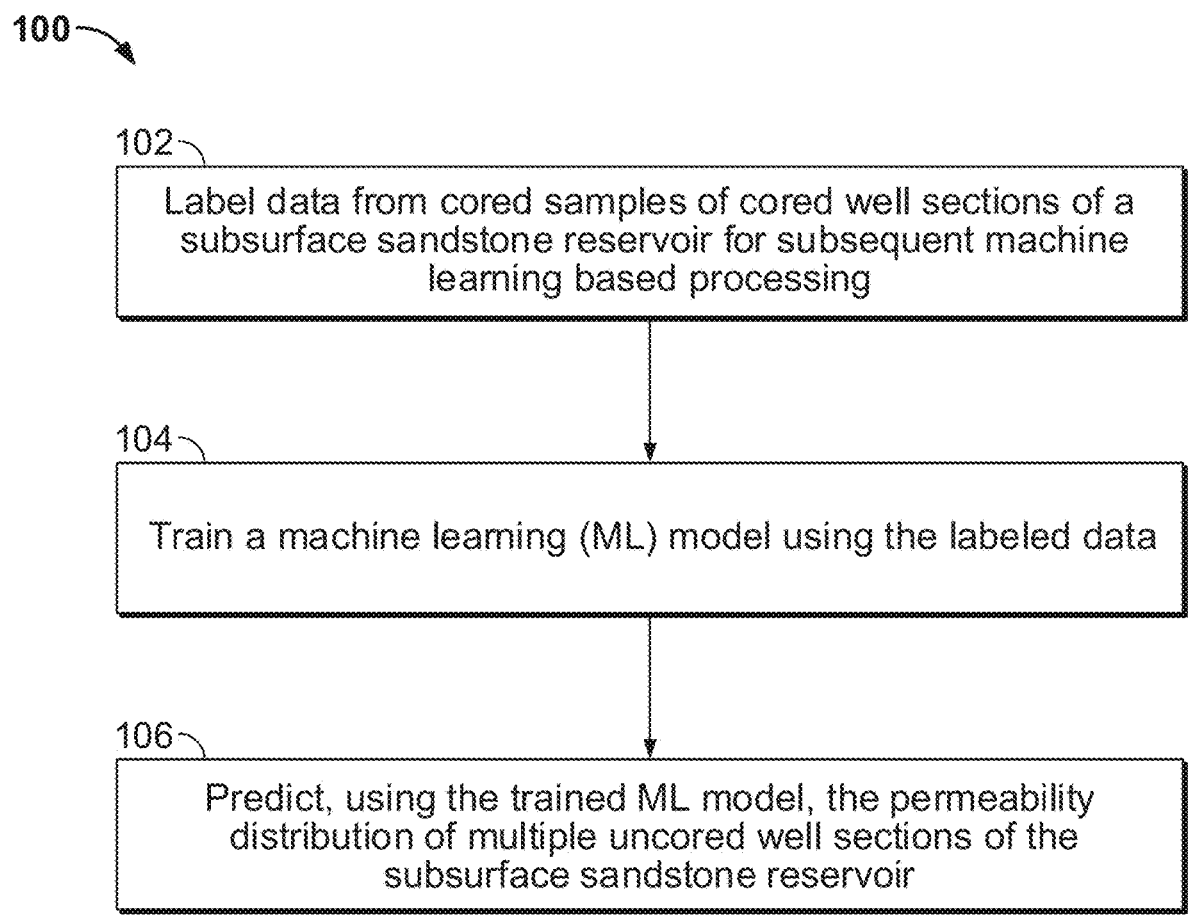
FIG. 1 illustrates an example flowchart of predicting permeability distribution of deep buried sandstones of a subsurface sandstone reservoir using machine learning.

FIG. 1 illustrates an example flowchart 100 of predicting permeability distribution of deep buried sandstones of a subsurface sandstone reservoir using machine learning.

At 102, data from cored samples of cored well sections of a subsurface sandstone reservoir are labeled for subsequent machine learning based processing. In some implementations, multiple cored samples are obtained from multiple cored well sections of the subsurface sandstone reservoir.

Core sampling methods such as thin section analysis can be performed on each cored sample to determine numerically reservoir qualities such as permeability, so that the cored well section corresponding to each cored sample can be labeled as one of high permeability reservoir zone, low permeability reservoir zone, and non-reservoir zone with no permeability. For example, cored well section with permeability over 5 millidarcys (mD) can be labeled high permeability reservoir zone, cored well section with permeability between 0.001 mD and 5 mD can be labeled low permeability reservoir zone, and cored well section with permeability below 0.001 mD can be labeled non-reservoir zone. Thin section analysis can include petrographic analysis of thin sections made from rocks from the cored samples to determine reservoir qualities such as permeability and reservoir homogeneity.

Figure 2:
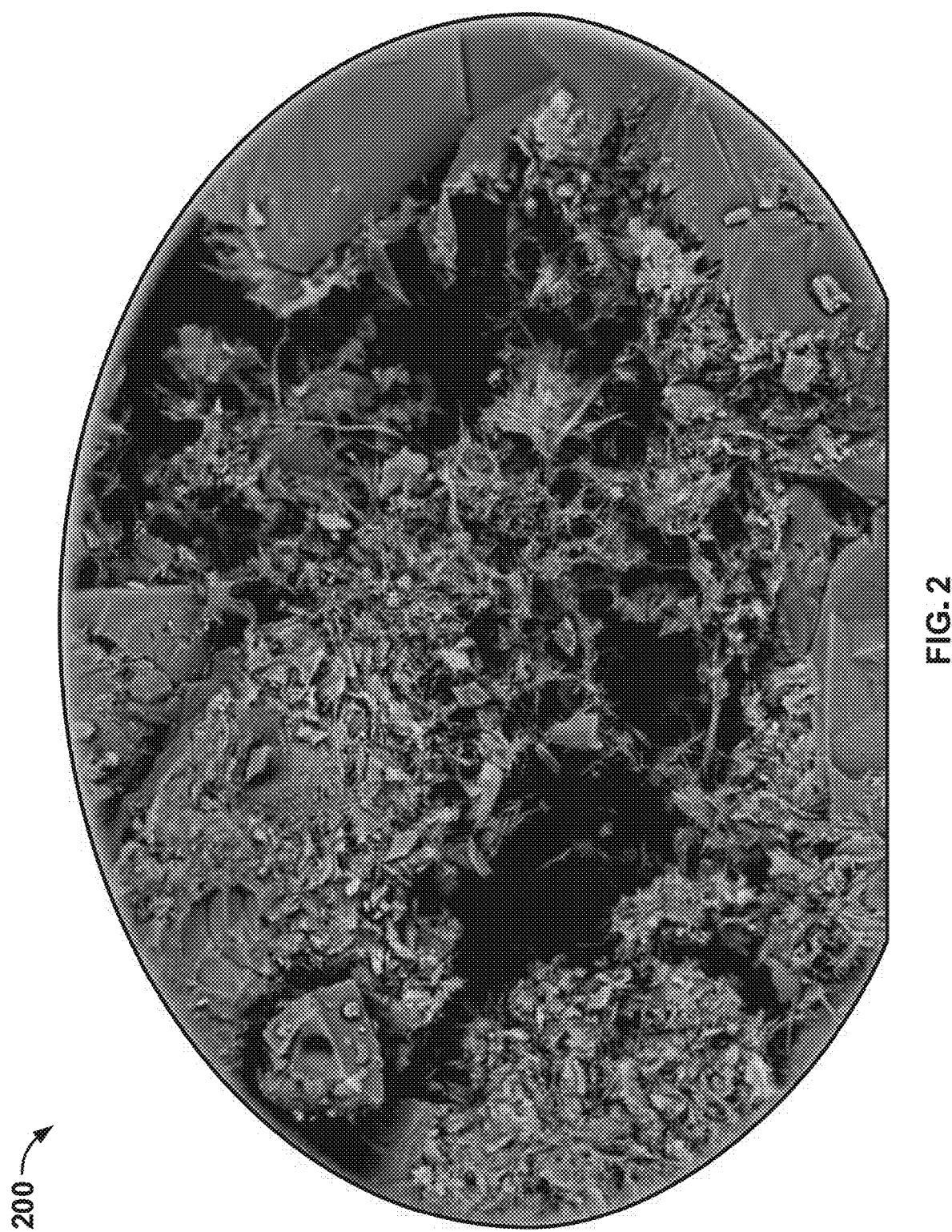
FIG. 2 illustrates a SEM image of authigenic clay of illite with associated low permeability reservoir zone.
Figure 3:
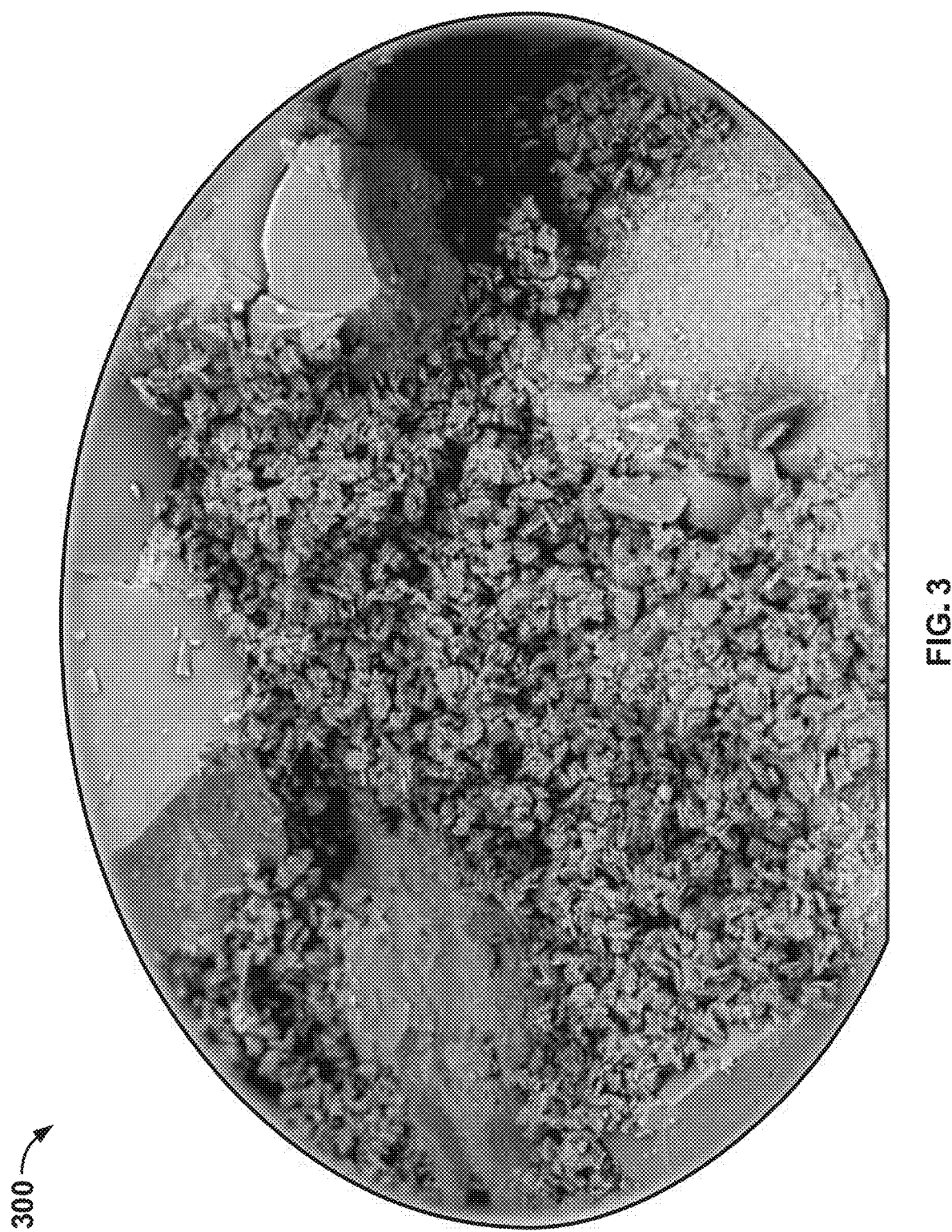
FIG. 3 illustrates a SEM image of authigenic clay of kaolinite with associated high permeability reservoir zone.

In some implementations, core sampling methods such as scanning electron microscopy (SEM) analysis or thin section analysis can be performed on each cored sample to label authigenic clay types, such as illite or kaolinite, of the cored well section corresponding to each cored sample. SEM analysis can include using imaging and detecting techniques to study different aspects of the composition of the cored samples at very high resolution, by recording various signals resulting from interactions of an electron beam with the sample as it is scanned in a raster pattern across the sample surface. High permeability reservoir zones can be correlated with cored well sections with authigenic clay type of kaolinite, and low permeability reservoir zones can be correlated with cored well sections with authigenic clay type of illite. FIG. 2 illustrates a SEM image 200 of authigenic clay of illite with associated low permeability reservoir zone. FIG. 3 illustrates a SEM image 300 of authigenic clay of kaolinite with associated high permeability reservoir zone.

In some implementations, wireline well log responses, such as wireline gamma log responses, can be obtained and labeled for each cored well section corresponding to each cored sample. Wireline well log responses can also be obtained for uncored well sections of the subsurface sandstone reservoir. High wireline gamma log responses can be correlated with well sections with authigenic clay type of illite due to the effect of the emission of ionizing radiation or particles caused by the spontaneous disintegration of atomic nuclei of potassium ion which is part of illite chemical structure. Well sections with authigenic clay type of kaolinite tend to have no effect on increasing gamma log readings of the wireline gamma log, mainly due to the absence of radioactive element in the chemical structure of kaolinite. Therefore a wireline well log response of a cored well section with authigenic clay type of illite can be labeled as being associated with a cored well section with low permeability reservoir zone, and a wireline well log response of a cored well section with authigenic clay type of kaolinite can be labeled as being associated with a cored well section with high permeability reservoir zone.

At 104, the labeled wireline well log responses of cored well sections are used to train a machine learning (ML) model for predicting a permeability distribution of multiple uncored well sections of the subsurface sandstone reservoir. ML based methods such as Random Forest can be used to train the ML model. In some implementations, a number of cored well sections with wireline well log responses can be used to train the ML model. More specifically, a majority of the number of cored well sections can be used for training the ML model, and the remaining number of cored well sections can be used to test the trained ML model. In one example, 25 cored well sections with wireline well log responses can be used to train the ML model. Among the 25 cored well sections, 16 cored well sections can be used for training the ML model, and the remaining 9 cored well sections can be used to test the trained ML model.

In some implementations, training the ML model using cored well sections can include building decision trees. For example, cored well sections with features such as high permeability, low permeability, and non-reservoir zones are first selected from the total number of cored well sections available for ML model training. Next decision trees associated with the selected cored well sections are built. Then the number of metrics for each value of the features associated with each node of a decision tree is determined. The aforementioned steps for building decision trees are repeated until preconfigured stop conditions are met.

In some implementations, different model architectures can be used to minimize the error between true value and measured value and improve the model prediction. Wireline well log responses can be calibrated and conditioned in order to minimize the error. Several blind testing techniques can be applied to verify the trained ML model. In the aforementioned example of 25 cored well sections with wireline well log responses, the blind testing techniques can be applied to the remaining 9 cored well sections.

At 106, the trained ML model is used to predict the permeability distribution of multiple uncored well sections of the subsurface sandstone reservoir, based on wireline well log responses of the multiple uncored well sections. Leave out analysis can be done to get the best prediction ML model and this ML model can be used with other conventional logs to predict the sweet spot of high permeability facies for the uncored well sections. These logs can be upscaled, for example, using blocking of the logs, to a 3D grid to correlate with seismic attributes of the subsurface sandstone reservoir. Quality control of the upscaled logs can be done by comparing statistical parameters, for example, the mean and standard deviation values, between the upscaled logs and the logs before upscaling.

Figure 4:
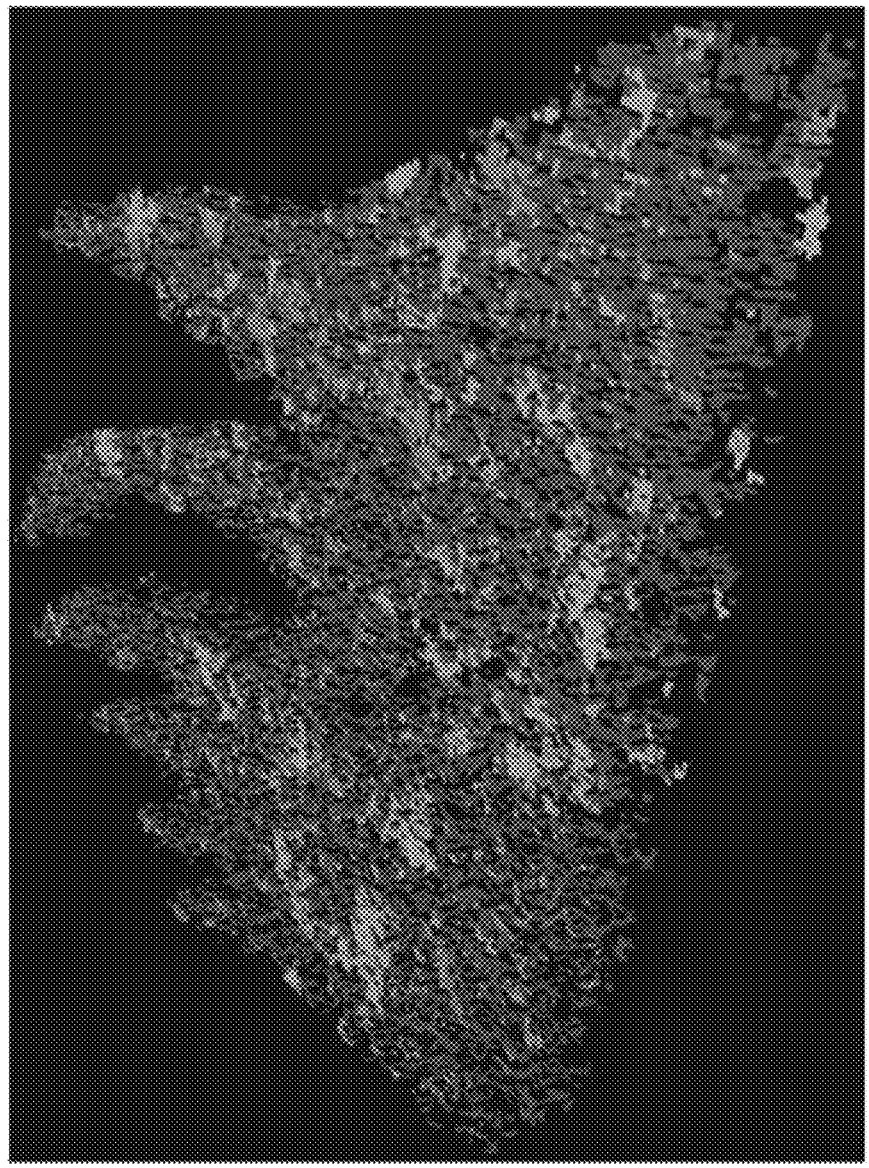
FIG. 4 illustrates a 3D map showing the distributions of reservoir zones with high permeability (kaolinite rich) and reservoir zones with low permeability (illite rich).

FIG. 4 illustrates a 3D map 400 showing the distributions of reservoir zones with high permeability (kaolinite rich) and reservoir zones with low permeability (illite rich), in both cored and uncored well sections for prediction of reservoir qualities such as permeability in highly heterogeneous play.

Figure 5:
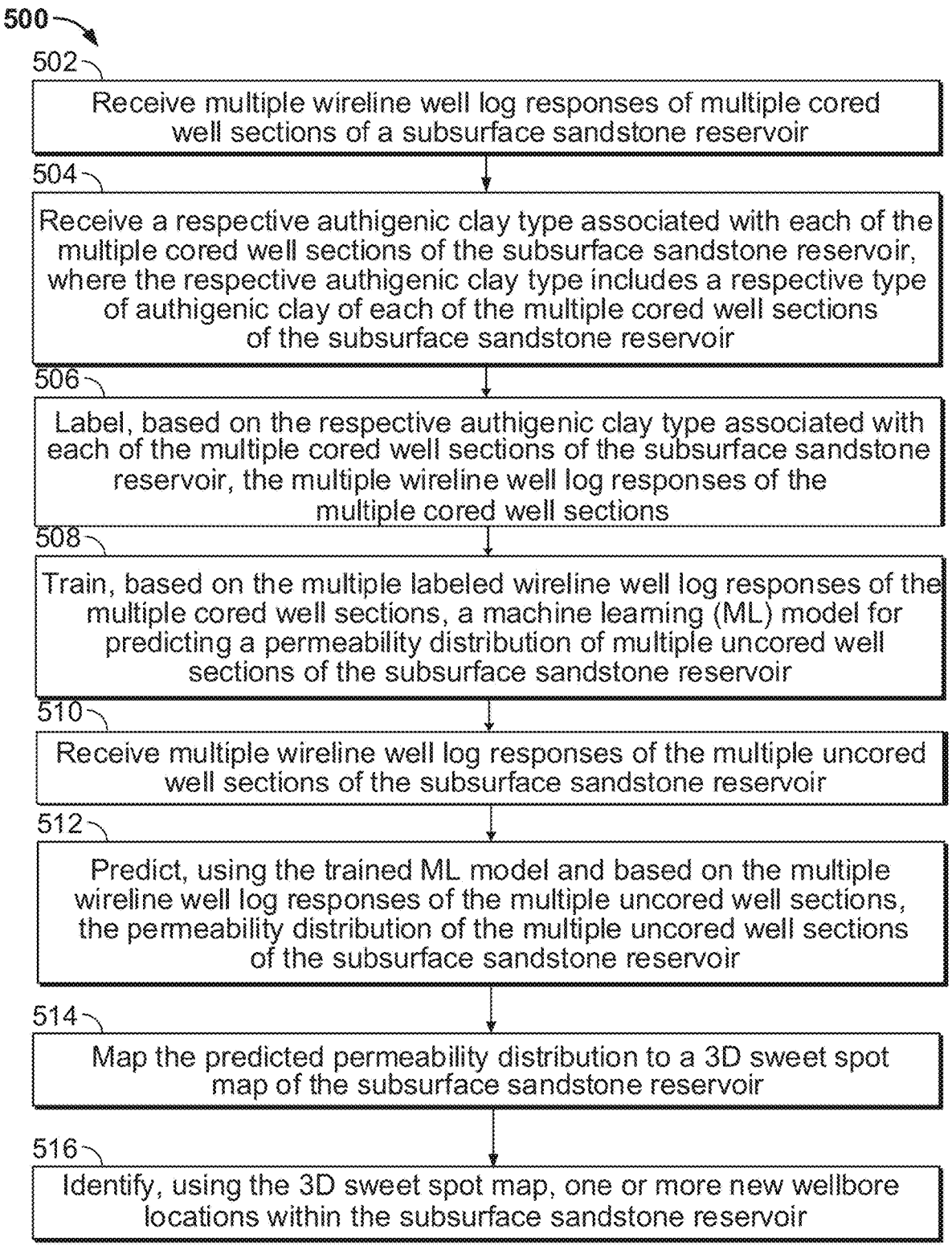
FIG. 5 illustrates an example process of predicting permeability distribution of deep buried sandstones of a subsurface sandstone reservoir using machine learning.

FIG. 5 illustrates an example process 500 of prediction of permeability distribution of uncored well sections of deep buried sandstones of a subsurface sandstone reservoir using machine learning. For convenience, the process 500 will be described as being performed by a system of one or more computers, located in one or more locations, and programmed appropriately in accordance with this specification.

At 502, a computer system receives multiple wireline well log responses of multiple cored well sections of a subsurface sandstone reservoir.

At 504, the computer system receives a respective authigenic clay type associated with each of the multiple cored well sections of the subsurface sandstone reservoir, where the respective authigenic clay type includes a respective type of authigenic clay of each of the multiple cored well sections of the subsurface sandstone reservoir.

At 506, the computer system labels, based on the respective authigenic clay type associated with each of the multiple cored well sections of the subsurface sandstone reservoir, the multiple wireline well log responses of the multiple cored well sections.

At 508, the computer system trains, based on the multiple labeled wireline well log responses of the multiple cored well sections, a machine learning (ML) model for predicting a permeability distribution of multiple uncored well sections of the subsurface sandstone reservoir.

At 510, the computer system receives multiple wireline well log responses of the multiple uncored well sections of the subsurface sandstone reservoir.

At 512, the computer system predicts, using the trained ML model and based on the multiple wireline well log responses of the multiple uncored well sections, the permeability distribution of the multiple uncored well sections of the subsurface sandstone reservoir.

At 514, the computer system maps the predicted permeability distribution to a 3D sweet spot map of the subsurface sandstone reservoir.

At 516, the computer system identifies, using the 3D sweet spot map, one or more new wellbore locations within the subsurface sandstone reservoir.

Figure 6:
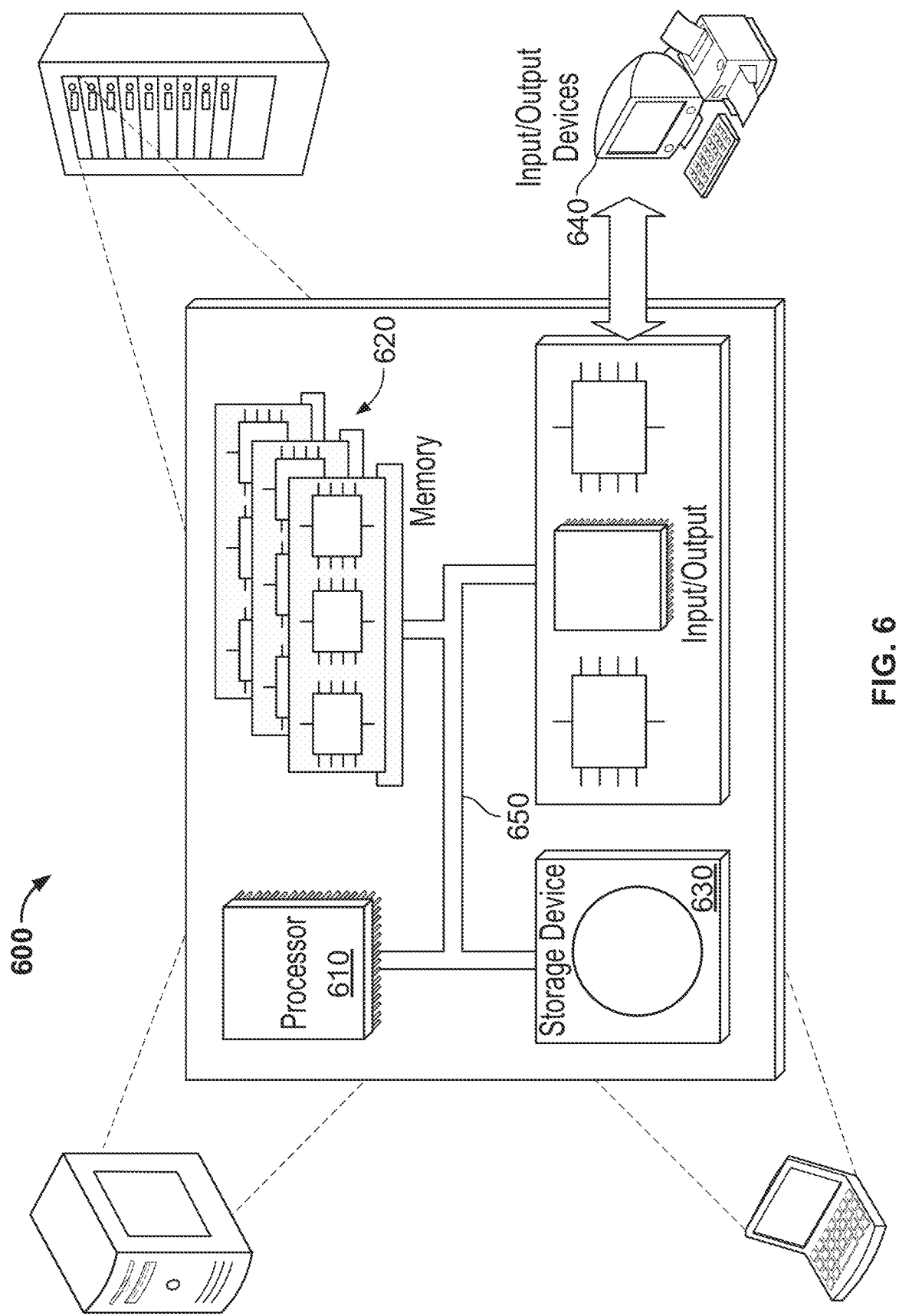
FIG. 6 is a schematic illustration of example computer systems that can be used to execute implementations of the present disclosure.

FIG. 6 illustrates a schematic diagram of an example computing system 600. The system 600 can be used for the operations described in association with the implementations described herein. For example, the system 600 may be included in any or all of the server components discussed herein. The system 600 includes a processor 610, a memory 620, a storage device 630, and an input/output device 640. The components 610, 620, 630, and 640 are interconnected using a system bus 650. The processor 610 is capable of processing instructions for execution within the system 600. In some implementations, the processor 610 is a single-threaded processor. The processor 610 is a multi-threaded processor. The processor 610 is capable of processing instructions stored in the memory 620 or on the storage device 630 to display graphical information for a user interface on the input/output device 640.

The memory 620 stores information within the system 600. In some implementations, the memory 620 is a computer-readable medium. The memory 620 is a volatile memory unit. The memory 620 is a non-volatile memory unit. The storage device 630 is capable of providing mass storage for the system 600. The storage device 630 is a computer-readable medium. The storage device 630 may be a floppy disk device, a hard disk device, an optical disk device, or a tape device. The input/output device 640 provides input/output operations for the system 600. The input/output device 640 includes a keyboard and/or pointing device. The input/output device 640 includes a display unit for displaying graphical user interfaces.

Certain aspects of the subject matter described here can be implemented as a method. Multiple wireline well log responses of multiple cored well sections of a subsurface sandstone reservoir are received. A respective authigenic clay type associated with each of the multiple cored well sections of the subsurface sandstone reservoir is received, where the respective authigenic clay type includes a respective type of authigenic clay of each of the multiple cored well sections of the subsurface sandstone reservoir. The multiple wireline well log responses of the multiple cored well sections are labeled based on the respective authigenic clay type associated with each of the multiple cored well sections of the subsurface sandstone reservoir. A machine learning (ML) model for predicting a permeability distribution of multiple uncored well sections of the subsurface sandstone reservoir is trained based on the multiple labeled wireline well log responses of the multiple cored well sections. Multiple wireline well log responses of the multiple uncored well sections of the subsurface sandstone reservoir are received. The permeability distribution of the multiple uncored well sections of the subsurface sandstone reservoir is predicted using the trained ML model and based on the multiple wireline well log responses of the multiple uncored well sections. The predicted permeability distribution is mapped to a 3D sweet spot map of the subsurface sandstone reservoir. One or more new wellbore locations within the subsurface sandstone reservoir are identified using the 3D sweet spot map.

An aspect taken alone or combinable with any other aspect includes the following features. Labeling the multiple wireline well log responses of the multiple cored well sections includes labeling a respective cored well section corresponding to each wireline well log response as one of a high permeability reservoir zone, a low permeability reservoir zone, and a non-reservoir zone.

An aspect taken alone or combinable with any other aspect includes the following features. Labeling the respective cored well section corresponding to each wireline well log response as one of the high permeability reservoir zone, the low permeability reservoir zone, or the non-reservoir zone includes labeling the respective cored well section with an authigenic clay type of kaolinite as the high permeability reservoir zone, and labeling the respective cored well section with an authigenic clay type of illite as the low permeability reservoir zone.

An aspect taken alone or combinable with any other aspect includes the following features. Training the ML model includes learning, using the multiple labeled wireline well log responses of the multiple cored well sections, a functional relationship between the multiple wireline well log responses of the multiple cored well sections and a permeability distribution of the multiple cored well sections.

An aspect taken alone or combinable with any other aspect includes the following features. The multiple wireline well log responses of the multiple cored well sections includes multiple wireline gamma ray well log responses of the multiple cored well sections.

An aspect taken alone or combinable with any other aspect includes the following features. The respective authigenic clay type associated with each of the multiple cored well sections of the subsurface sandstone reservoir includes one of illite and kaolinite.

An aspect taken alone or combinable with any other aspect includes the following features. Training the ML model includes testing the trained ML model using a subset of the multiple labeled wireline well log responses.

Certain aspects of the subject matter described in this disclosure can be implemented as a non-transitory computer-readable medium storing instructions which, when executed by a hardware-based processor perform operations including the methods described here.

Certain aspects of the subject matter described in this disclosure can be implemented as a computer-implemented system that includes one or more processors including a hardware-based processor, and a memory storage including a non-transitory computer-readable medium storing instructions which, when executed by the one or more processors performs operations including the methods described here.

Implementations and all of the functional operations described in this specification may be realized in digital electronic circuitry, or in computer software, firmware, or hardware, including the structures disclosed in this specification and their structural equivalents, or in combinations of one or more of them. Implementations may be realized as one or more computer program products (i.e., one or more modules of computer program instructions encoded on a computer readable medium for execution by, or to control the operation of, data processing apparatus). The computer readable medium may be a machine-readable storage device, a machine-readable storage substrate, a memory device, a composition of matter effecting a machine-readable propagated signal, or a combination of one or more of them. The term "computing system" encompasses all apparatus, devices, and machines for processing data, including by way of example a programmable processor, a computer, or multiple processors or computers. The apparatus may include, in addition to hardware, code that creates an execution environment for the computer program in question (e.g., code that constitutes processor firmware, a protocol stack, a database management system, an operating system, or any appropriate combination of one or more thereof). A propagated signal is an artificially generated signal (e.g., a machine-generated electrical, optical, or electromagnetic signal) that is generated to encode information for transmission to suitable receiver apparatus.

A computer program (also known as a program, software, software application, script, or code) may be written in any appropriate form of programming language, including compiled or interpreted languages, and it may be deployed in any appropriate form, including as a stand-alone program or as a module, component, subroutine, or other unit suitable for use in a computing environment. A computer program does not necessarily correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one computer or on multiple computers that are located at one site or distributed across multiple sites and interconnected by a communication network.

The processes and logic flows described in this specification may be performed by one or more programmable processors executing one or more computer programs to perform functions by operating on input data and generating output. The processes and logic flows may also be performed by, and apparatus may also be implemented as, special purpose logic circuitry (e.g., an FPGA (field programmable gate array) or an ASIC (application specific integrated circuit)).

Processors suitable for the execution of a computer program include, by way of example, both general and special purpose microprocessors, and any one or more processors of any appropriate kind of digital computer. Generally, a processor will receive instructions and data from a read only memory or a random access memory or both. Elements of a computer can include a processor for performing instructions and one or more memory devices for storing instructions and data. Generally, a computer will also include, or be operatively coupled to receive data from or transfer data to, or both, one or more mass storage devices for storing data (e.g., magnetic, magneto optical disks, or optical disks). However, a computer need not have such devices. Moreover, a computer may be embedded in another device (e.g., a mobile telephone, a personal digital assistant (PDA), a mobile audio player, a Global Positioning System (GPS) receiver). Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD-ROM disks. The processor and the memory may be supplemented by, or incorporated in, special purpose logic circuitry.

To provide for interaction with a user, implementations may be realized on a computer having a display device (e.g., a CRT (cathode ray tube), LCD (liquid crystal display) monitor) for displaying information to the user and a keyboard and a pointing device (e.g., a mouse, a trackball, a touch-pad), by which the user may provide input to the computer. Other kinds of devices may be used to provide for interaction with a user as well; for example, feedback provided to the user may be any appropriate form of sensory feedback (e.g., visual feedback, auditory feedback, tactile feedback); and input from the user may be received in any appropriate form, including acoustic, speech, or tactile input.

Implementations may be realized in a computing system that includes a back end component (e.g., as a data server), a middleware component (e.g., an application server), and/or a front end component (e.g., a client computer having a graphical user interface or a Web browser, through which a user may interact with an implementation), or any appropriate combination of one or more such back end, middleware, or front end components. The components of the system may be interconnected by any appropriate form or medium of digital data communication (e.g., a communication network). Examples of communication networks include a local area network ("LAN") and a wide area network ("WAN"), e.g., the Internet.

The computing system may include clients and servers. A client and server are generally remote from each other and typically interact through a communication network. The relationship of client and server arises by virtue of computer programs running on the respective computers and having a client-server relationship to each other.

While this specification contains many specifics, these should not be construed as limitations on the scope of the disclosure or of what may be claimed, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

A number of implementations have been described. Nevertheless, it will be understood that various modifications may be made without departing from the spirit and scope of the disclosure. For example, various forms of the flows shown above may be used, with steps re-ordered, added, or removed. Accordingly, other implementations are within the scope of the following claims.

What is claimed is:

1. A computer-implemented method, comprising:
receiving a plurality of wireline well log responses of a plurality of cored well sections of a subsurface sandstone reservoir;
receiving a respective authigenic clay type associated with each of the plurality of cored well sections of the subsurface sandstone reservoir, wherein the respective authigenic clay type comprises a respective type of authigenic clay of each of the plurality of cored well sections of the subsurface sandstone reservoir;
labeling, based on the respective authigenic clay type associated with each of the plurality of cored well sections of the subsurface sandstone reservoir, the plurality of wireline well log responses of the plurality of cored well sections;
training, based on the plurality of labeled wireline well log responses of the plurality of cored well sections, a machine learning (ML) model for predicting a permeability distribution of a plurality of uncored well sections of the subsurface sandstone reservoir;
receiving a plurality of wireline well log responses of the plurality of uncored well sections of the subsurface sandstone reservoir;
predicting, using the trained ML model and based on the plurality of wireline well log responses of the plurality of uncored well sections, the permeability distribution of the plurality of uncored well sections of the subsurface sandstone reservoir;
mapping the predicted permeability distribution to a 3D sweet spot map of the subsurface sandstone reservoir; and
identifying, using the 3D sweet spot map, one or more new wellbore locations within the subsurface sandstone reservoir.

2. The computer-implemented method of claim 1, wherein labeling the plurality of wireline well log responses of the plurality of cored well sections comprises labeling a respective cored well section corresponding to each wireline well log response as one of a high permeability reservoir zone, a low permeability reservoir zone, and a non-reservoir zone.

3. The computer-implemented method of claim 2, wherein labeling the respective cored well section corresponding to each wireline well log response as one of the high permeability reservoir zone, the low permeability reservoir zone, or the non-reservoir zone comprises:
labeling the respective cored well section with an authigenic clay type of kaolinite as the high permeability reservoir zone; and
labeling the respective cored well section with an authigenic clay type of illite as the low permeability reservoir zone.

4. The computer-implemented method of claim 1, wherein training the ML model comprises learning, using the plurality of labeled wireline well log responses of the plurality of cored well sections, a functional relationship between the plurality of wireline well log responses of the plurality of cored well sections and a permeability distribution of the plurality of cored well sections.

5. The computer-implemented method of claim 1, wherein the plurality of wireline well log responses of the plurality of cored well sections comprise a plurality of wireline gamma ray well log responses of the plurality of cored well sections.

6. The computer-implemented method of claim 1, wherein the respective authigenic clay type associated with each of the plurality of cored well sections of the subsurface sandstone reservoir comprises one of illite and kaolinite.

7. The computer-implemented method of claim 1, wherein training the ML model comprises testing the trained ML model using a subset of the plurality of labeled wireline well log responses.

8. A non-transitory, computer-readable medium storing one or more instructions executable by a computer system to perform operations comprising:
receiving a plurality of wireline well log responses of a plurality of cored well sections of a subsurface sandstone reservoir;
receiving a respective authigenic clay type associated with each of the plurality of cored well sections of the subsurface sandstone reservoir, wherein the respective authigenic clay type comprises a respective type of authigenic clay of each of the plurality of cored well sections of the subsurface sandstone reservoir;
labeling, based on the respective authigenic clay type associated with each of the plurality of cored well sections of the subsurface sandstone reservoir, the plurality of wireline well log responses of the plurality of cored well sections;
training, based on the plurality of labeled wireline well log responses of the plurality of cored well sections, a machine learning (ML) model for predicting a permeability distribution of a plurality of uncored well sections of the subsurface sandstone reservoir;
receiving a plurality of wireline well log responses of the plurality of uncored well sections of the subsurface sandstone reservoir;
predicting, using the trained ML model and based on the plurality of wireline well log responses of the plurality of uncored well sections, the permeability distribution of the plurality of uncored well sections of the subsurface sandstone reservoir;
mapping the predicted permeability distribution to a 3D sweet spot map of the subsurface sandstone reservoir; and
identifying, using the 3D sweet spot map, one or more new wellbore locations within the subsurface sandstone reservoir.

9. The non-transitory, computer-readable medium of claim 8, wherein labeling the plurality of wireline well log responses of the plurality of cored well sections comprises labeling a respective cored well section corresponding to each wireline well log response as one of a high permeability reservoir zone, a low permeability reservoir zone, and a non-reservoir zone.

10. The non-transitory, computer-readable medium of claim 9, wherein labeling the respective cored well section corresponding to each wireline well log response as one of the high permeability reservoir zone, the low permeability reservoir zone, or the non-reservoir zone comprises:
labeling the respective cored well section with an authigenic clay type of kaolinite as the high permeability reservoir zone; and
labeling the respective cored well section with an authigenic clay type of illite as the low permeability reservoir zone.

11. The non-transitory, computer-readable medium of claim 8, wherein training the ML model comprises learning, using the plurality of labeled wireline well log responses of the plurality of cored well sections, a functional relationship between the plurality of wireline well log responses of the plurality of cored well sections and a permeability distribution of the plurality of cored well sections.

12. The non-transitory, computer-readable medium of claim 8, wherein the plurality of wireline well log responses of the plurality of cored well sections comprise a plurality of wireline gamma ray well log responses of the plurality of cored well sections.

13. The non-transitory, computer-readable medium of claim 8, wherein the respective authigenic clay type associated with each of the plurality of cored well sections of the subsurface sandstone reservoir comprises one of illite and kaolinite.

14. The non-transitory, computer-readable medium of claim 8, wherein training the ML model comprises testing the trained ML model using a subset of the plurality of labeled wireline well log responses.

15. A computer-implemented system, comprising:
one or more computers; and
one or more computer memory devices interoperably coupled with the one or more computers and having tangible, non-transitory, machine-readable media storing one or more instructions that, when executed by the one or more computers, perform one or more operations comprising:
receiving a plurality of wireline well log responses of a plurality of cored well sections of a subsurface sandstone reservoir;
receiving a respective authigenic clay type associated with each of the plurality of cored well sections of the subsurface sandstone reservoir, wherein the respective authigenic clay type comprises a respective type of authigenic clay of each of the plurality of cored well sections of the subsurface sandstone reservoir;
labeling, based on the respective authigenic clay type associated with each of the plurality of cored well sections of the subsurface sandstone reservoir, the plurality of wireline well log responses of the plurality of cored well sections;
training, based on the plurality of labeled wireline well log responses of the plurality of cored well sections, a machine learning (ML) model for predicting a permeability distribution of a plurality of uncored well sections of the subsurface sandstone reservoir;
receiving a plurality of wireline well log responses of the plurality of uncored well sections of the subsurface sandstone reservoir;
predicting, using the trained ML model and based on the plurality of wireline well log responses of the plurality of uncored well sections, the permeability distribution of the plurality of uncored well sections of the subsurface sandstone reservoir;
mapping the predicted permeability distribution to a 3D sweet spot map of the subsurface sandstone reservoir; and
identifying, using the 3D sweet spot map, one or more new wellbore locations within the subsurface sandstone reservoir.

16. The computer-implemented system of claim 15, wherein labeling the plurality of wireline well log responses of the plurality of cored well sections comprises labeling a respective cored well section corresponding to each wireline well log response as one of a high permeability reservoir zone, a low permeability reservoir zone, and a non-reservoir zone.

17. The computer-implemented system of claim 16, wherein labeling the respective cored well section corresponding to each wireline well log response as one of the high permeability reservoir zone, the low permeability reservoir zone, or the non-reservoir zone comprises:
labeling the respective cored well section with an authigenic clay type of kaolinite as the high permeability reservoir zone; and
labeling the respective cored well section with an authigenic clay type of illite as the low permeability reservoir zone.

18. The computer-implemented system of claim 15, wherein training the ML model comprises learning, using the plurality of labeled wireline well log responses of the plurality of cored well sections, a functional relationship between the plurality of wireline well log responses of the plurality of cored well sections and a permeability distribution of the plurality of cored well sections.

19. The computer-implemented system of claim 15, wherein the plurality of wireline well log responses of the plurality of cored well sections comprise a plurality of wireline gamma ray well log responses of the plurality of cored well sections.

20. The computer-implemented system of claim 15, wherein the respective authigenic clay type associated with each of the plurality of cored well sections of the subsurface sandstone reservoir comprises one of illite and kaolinite.

* * * * *